(12) United States Patent
Jannot et al.

(10) Patent No.: US 8,122,604 B2
(45) Date of Patent: Feb. 28, 2012

(54) METHOD FOR FASTENING AN ACCESSORY TO A PLASTIC FUEL TANK

(75) Inventors: Frederic Jannot, Bousval (BE); Bjorn Criel, Merelbeke (BE); Hugues Masse, Brussels (BE); Barbara Mabed, Brussels (BE); Herve Lemoine, Tracy le Mont (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 608 days.

(21) Appl. No.: 12/278,525

(22) PCT Filed: Feb. 12, 2007

(86) PCT No.: PCT/EP2007/051326
§ 371 (c)(1),
(2), (4) Date: Aug. 6, 2008

(87) PCT Pub. No.: WO2007/093573
PCT Pub. Date: Aug. 23, 2007

(65) Prior Publication Data
US 2009/0019683 A1 Jan. 22, 2009

(30) Foreign Application Priority Data
Feb. 13, 2006 (FR) .................................. 06 01258

(51) Int. Cl.
*B21D 53/88* (2006.01)
*B60P 3/22* (2006.01)
*B29C 49/00* (2006.01)

(52) U.S. Cl. .................... 29/897.2; 29/525.01; 29/527.1; 280/834; 220/4.13; 220/4.14; 220/562; 264/242; 264/523; 264/537

(58) Field of Classification Search ................. 29/897.2, 29/463, 525.01, 527.1; 280/834; 220/4.12, 220/4.13, 4.14, 562; 264/242, 249, 523, 264/537, 539, 540
See application file for complete search history.

(56) References Cited

U.S. PATENT DOCUMENTS

| | | | | |
|---|---|---|---|---|
| 4,396,562 A | * | 8/1983 | Heaume | 264/445 |
| 4,716,931 A | | 1/1988 | Shibamoto | |
| 4,750,513 A | | 6/1988 | Griffin et al. | |
| 5,514,323 A | * | 5/1996 | Ramioulle | 264/516 |

(Continued)

FOREIGN PATENT DOCUMENTS
DE 19816317 A1 10/1999
(Continued)

OTHER PUBLICATIONS
PCT Search Report dated May 22, 2007 for International Application No. PCT/EP2007/051326 (2 p.).
(Continued)

*Primary Examiner* — Jermie Cozart
(74) *Attorney, Agent, or Firm* — Oblon, Spivak, McClelland, Maier & Neustadt, L.L.P.

(57) ABSTRACT

Method for fastening an accessory (2) at at least two points of a wall of a plastic fuel tank, this fastening taking place during the actual manufacture of the tank by molding. According to this method, the accessory (2) is provided, at least at one of its fastening points, with a fastening part (1, 1') in such a way that the accessory (2) is fastened to the wall of the tank and can move relative to the corresponding fastening point on the wall of the tank (3).

17 Claims, 3 Drawing Sheets

U.S. PATENT DOCUMENTS

| | | |
|---|---|---|
| 6,293,256 B1 | 9/2001 | Kleppner et al. |
| 2001/0015513 A1 | 8/2001 | Schaftingen et al. |
| 2005/0205156 A1 | 9/2005 | Ganachaud et al. |
| 2005/0217735 A1 | 10/2005 | Firtion et al. |
| 2006/0102634 A1* | 5/2006 | Potter et al. .......... 220/562 |
| 2007/0290414 A1 | 12/2007 | Criel |
| 2008/0164639 A1 | 7/2008 | Criel et al. |

FOREIGN PATENT DOCUMENTS

| | | |
|---|---|---|
| EP | 1110697 A2 | 6/2001 |
| FR | 2882962 A1 | 9/2006 |
| GB | 1410215 | 10/1975 |
| WO | WO03053731 A1 | 7/2003 |
| WO | WO2004024487 A1 | 3/2004 |
| WO | WO2006008308 A1 | 1/2006 |
| WO | WO2006064004 A1 | 6/2006 |
| WO | WO2006095024 A1 | 9/2006 |
| WO | WO2007000454 A1 | 1/2007 |

OTHER PUBLICATIONS

Search Report dated Oct. 16, 2006 from Institut National De La Propriete Industrielle for French Application No. 0601258 (2 p.).

U.S. Appl. No. 11/721,785, filed Jun. 22, 2006, WO2006064004.

U.S. Appl. No. 11/908,336, filed Sep. 14, 2006, WO2006095024.

U.S. Appl. No. 11/993,424, filed Jan. 4, 2007, WO2007000454.

* cited by examiner

Fig. 1
Fig. 1a
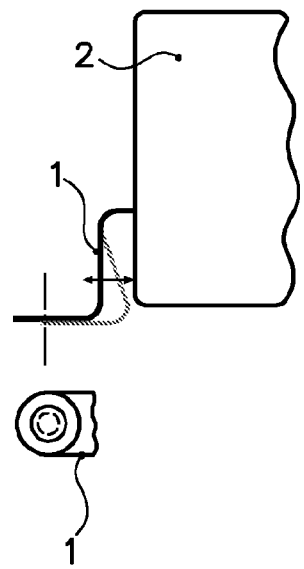
Fig. 1b
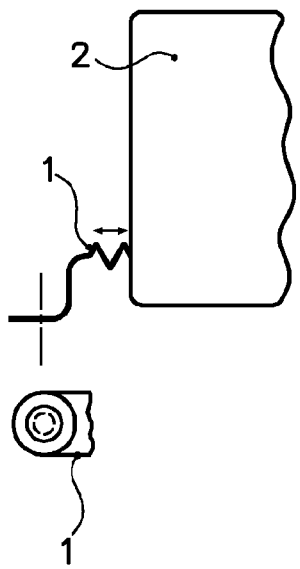
Fig. 1c
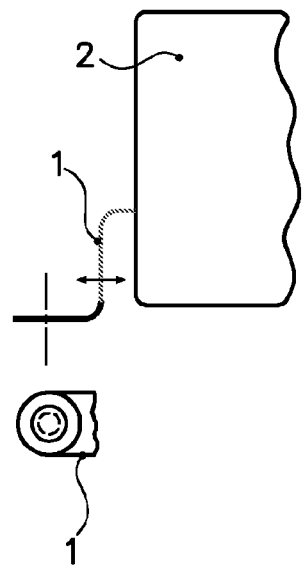
Fig. 2
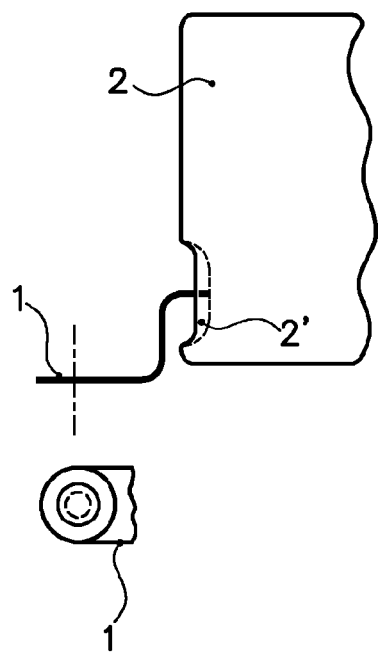

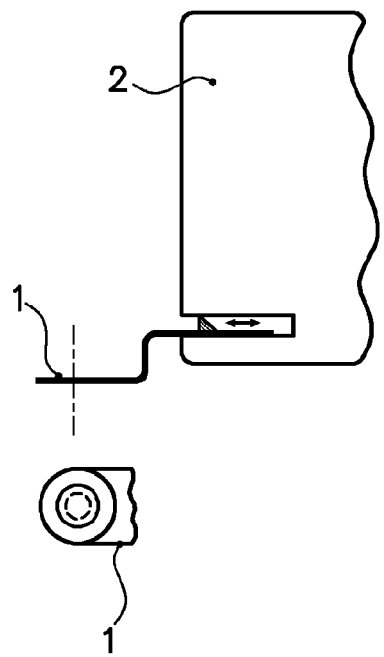
Fig. 3
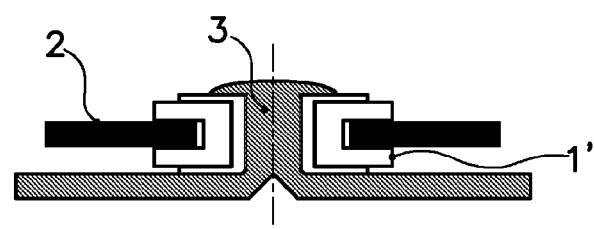
Fig. 4
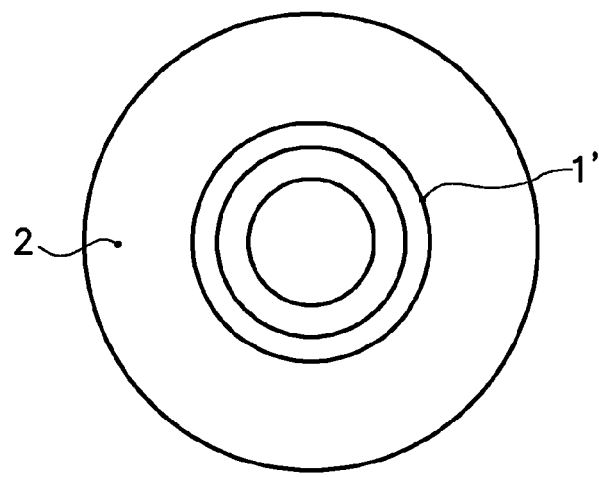

METHOD FOR FASTENING AN ACCESSORY TO A PLASTIC FUEL TANK

CROSS-REFERENCE TO RELATED APPLICATIONS

This application is a U.S. national stage application under 35 U.S.C. §371 of International Application No. PCT/EP2007/051326, filed Feb. 2, 2007, which claims priority to French Application No. 0601258, filed Feb. 13, 2006, all of these applications being herein incorporated by reference in their entirety for all purposes.

BACKGROUND OF THE INVENTION

I. Field of the Invention

The present invention relates to a method for fastening an accessory to a plastic fuel tank.

II. Description of Related Art

Fuel tanks on-board vehicles of various kinds must generally meet sealing and permeability standards in relation to the type of usage for which they are designed and the environmental requirements with which they must comply. At the present time, both in Europe and throughout the world, there is a substantial tightening of the requirements regarding the limitation of pollutant emissions into the atmosphere and into the environment in general.

To limit these emissions, care is taken in particular to position the accessories (ventilation lines, valves, baffles, stiffeners, etc.) inside the tank and/or the fill tube (see for example Application WO 2004/024487 in the name of the Applicant). However, when these elements are fastened to the tank after it has been moulded, it is generally necessary to make at least one opening in the tank so as to be able to introduce said elements into the tank and to fasten them thereto. Hence there may be potential sealing problems near this opening.

The Applicant has therefore developed a method of initially moulding a parison that includes at least one slot for introducing thereinto (and fixing thereto) accessories during the actual moulding of the tank and thus avoiding drilling openings (see for example Application EP 1 110 697). However, the Applicant has found that in such a method, as the tank cools down after moulding it undergoes considerable shrinkage (typically about 3%), whereas the parts that have been incorporated into it during moulding are heated only slightly and thus undergo appreciably less shrinkage, even when they are also made of plastic (given that there may be large differences in thermal expansion/contraction between polymers). This may introduce deformations (and therefore internal tensile stresses) that are unacceptable in the case of a component fastened to the tank at at least two points. Large deformations may also be observed in service, by the wall of the tank swelling on contact with fuels.

Application WO 2006/008608 (the content of which is introduced for reference in the present application) relates to a particular fastening mode (snap-riveting). A variant of this method addresses the problem of deformation (contraction, expansion), but solves it by one particular form of the snap-rivet and of the associated hole (the rivet is oblong and formed in an oblong hole that also permits a sliding movement of the accessory relative to the wall of the tank when it is fixed thereto). To prevent the formation of a bead of material in the oblong hole that would block the sliding movement, the snap-rivet must have a shape controlled by a suitable tool (counter-former) that is preferably cooled, but this complicates both the method and the tooling.

BRIEF SUMMARY OF THE INVENTION

The object of the invention is therefore to provide a simpler method that allows an accessory to be incorporated into a plastic fuel tank during its manufacture by moulding, without generating any deformation after the tank has cooled, when the accessory is fixed thereto.

For this purpose, the invention relates to a method for fastening an accessory at at least two points on a wall of a plastic fuel tank, this fastening taking place during the actual manufacture of said tank by moulding, according to which the accessory is provided, at least at one of its fastening points, with a fastening part in such a way that although the accessory is fastened to the wall of the tank it can move relative to the corresponding fastening point on the wall of the tank.

The term "fuel tank" is understood to mean a sealed tank (or hollow body bounded by a wall) capable of storing fuel under diverse and varied usage and environmental conditions. An example of this tank is that with which motor vehicles are equipped.

The fuel tank according to the invention is made of a plastic.

The term "plastic" is understood to mean any material comprising at least one synthetic resin polymer.

All types of plastics may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly, random copolymers, linear block and other block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as well as a blend of polymeric materials with inorganic, organic and/or natural fillers such as, for example, but not limitingly: carbon, salts and other inorganic derivatives, natural or polymeric fibres. It is also possible to use multilayer structures consisting of stacked layers bonded together, comprising at least one of the polymers or copolymers described above.

One polymer often employed is polyethylene. Excellent results have been obtained with high-density polyethylene (HDPE).

The wall of the tank may consist of a single layer of thermoplastic or of two layers. One or more possible additional layers may advantageously consist of layers made of a material that is a barrier to liquid and/or gases. Preferably, the nature and the thickness of the barrier layer are chosen so as to minimize the permeability of the liquids and gases in contact with the internal surface of the tank. Preferably, this layer is based on a barrier resin, that is to say a resin that is impermeable to the fuel, such as for example EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably includes an EVOH-based barrier layer located between the HDPE-based outer layers.

Within the context of the invention, the term "accessory" is understood to mean:
any functional object or device which is generally associated with the fuel tank in its usual mode of use or operation and which cooperates with the latter in order to fulfil certain useful functions; or
a support for one or more such devices.

Non-limiting examples of such devices are: liquid pumps, level gauges, delivery tubes, reservoirs or baffles internal to the fuel tank, ventilation devices, electronic units and stiffening bars.

BRIEF DESCRIPTION OF THE DRAWINGS

In the drawings, wherein like reference numerals refer to similar components:

FIGS. 1a-c illustrate examples of an accessory provided with a deformable tab according to a first variant;

FIG. 2 illustrates a fastening part attached to a flexible portion of an accessory according to a second variant;

FIG. 3 illustrates a slide-type fastening mode according to a third variant; and FIG. 4 illustrates an anti-vibration/shock mounting according to the third variant.

DETAILED DESCRIPTION OF THE INVENTION

Figure 5:
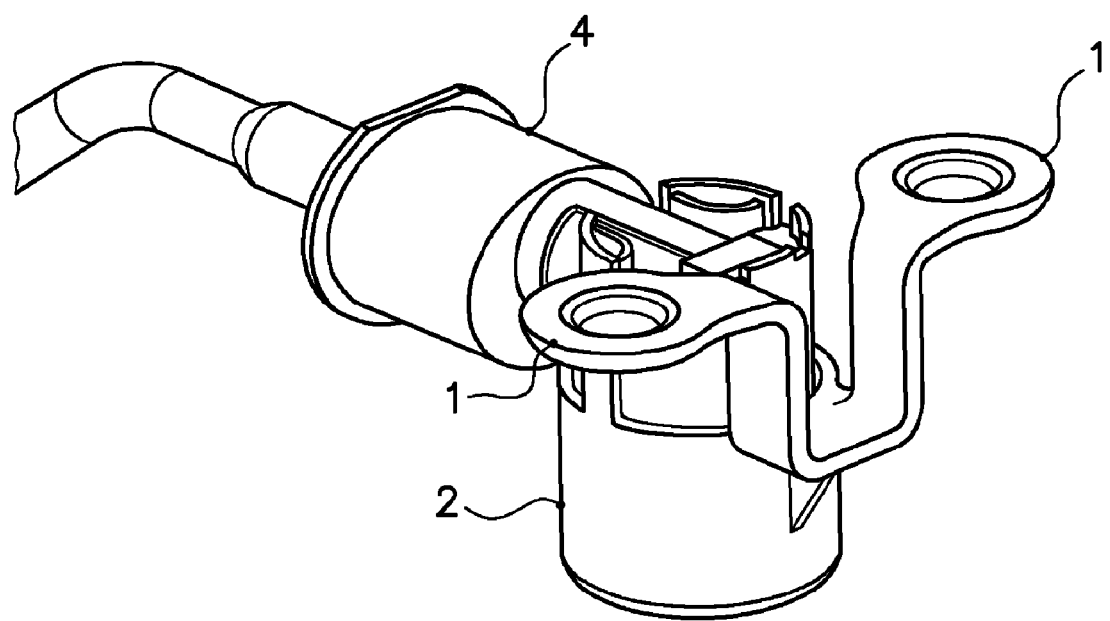
FIG. 5 illustrates a perspective view of an accessory according to another variant which serves as a support for a valve and includes two flexible tabs.

According to one advantageous way of implementing the method according to the invention, the accessory is in fact a preassembled structure comprising a support and one or more identical or different devices that are fastened thereto via any suitable fastening means. Examples of these means are clip-fastening, screw-fastening, welding, etc. It is also advantageous for the preassembled structure to bear means allowing additional devices to be joined that would be possibly fastened subsequently. These means are also clip-fastening devices, capped holes or threaded protuberances of circular shape for screwing, surface regions that can be welded, etc. Within the same concept, the accessory may consist of a simple support that includes suitable means for subsequently fastening one or more devices. In other words, the accessory preferably includes a support that is either provided with fastening means, for one or more functional devices of the fuel tank (and which may be the cover of the accessory), or bears one or more such devices directly.

According to the invention, at least one of the two points for fastening the accessory is provided with a fastening part. By this is meant both an additional part, attached to the accessory, and an excrescence moulded as one part with the accessory. This may be a fastening tab (i.e. an excrescence on its overall envelope) moulded as one part with the accessory or attached thereto. It may also be a device of the anti-vibration/shock mounting type or a part consisting partly of a flexible deformable material that can absorb shocks and vibrations. Preferably, each of the fastening points is provided with such an intermediate part.

According to the invention, although the accessory is fastened to the wall of the tank, it is important for there to be mobility relative to its point of fastening to the wall of the tank. Moreover, preferably all the points where the accessory is fastened to the wall of the tank are provided with a fastening part and in that the accessory can move relative to all the corresponding fastening points on the wall of the tank.

This mobility may be obtained in various ways.

According to a first variant of the invention, the fastening part is a deformable tab or excrescence that can deform owing to its geometry and/or its constituent material. This is shown schematically in FIG. 1, which illustrates a component (2) provided with a tab entirely made of a flexible material (1a), with a tab having a geometry aiding the deformation (1b) and with a two-material tab (1c), respectively. As regards the second (geometric) solution, the reader may refer to the copending application FR 05/02414 in the name of the Applicant (and the content of which is incorporated for reference in the present application), in which such geometries are illustrated in the context of deformable tubes. These involve mainly S-, V- or W-shaped pleats, turns (convolutions) or corrugations (bellows-shaped foldings).

According to a second variant of the invention, shown schematically in FIG. 2, the fastening part is a fastening tab (1) that is rigid but attached to a flexible portion (2') of the accessory (2).

According to a third variant of the invention, shown schematically in FIGS. 3 and 4, the fastening part (1) and the accessory (2) are both rigid, but they are fastened in a way that allows relative movement between them in at least one direction in space.

FIG. 3 illustrates a slide-type fastening mode that is very suitable. It consists in using a fastening tab (1) and in providing both the tab and the accessory (2) with complementary reliefs that allow one part to slide relative to the other.

Another suitable mode of fastening, which is illustrated in FIG. 4, consists in using, as fastening part, an anti-vibration/shock mounting (1') which is fastened to an orifice in the accessory (2) or in its fastening tab (1). A snap-rivet (3) produced in the wall of the tank is therefore the point of fastening to the wall of the tank relative to which the accessory (2) can move. Such a device may for example be used for fastening pumps or Venturi devices to the wall of the tank. In this variant, the flexible portion of the anti-vibration/shock mounting is preferably sufficiently deformable to compensate for any deformation of the tank. This device may be clip-fastened to or injection-overmoulded onto the accessory, and therefore be integral with it. Alternatively, it can also move relative to the accessory.

The figures mentioned above are schematic and beneath each of them there is a top view of a portion of the fastening part.

An accessory (2) that may be suitable within the context of the invention is also illustrated in FIG. 5. This accessory (2) is a support for a valve (4) and it comprises two flexible tabs (1), which are moulded as one piece with it and each is provided with an orifice (for snap-riveting, but also other types of riveting, etc.).

According to the invention, the accessory is fastened to the wall of the tank while it is being moulded and the mobility of the accessory relative to the fastening part is preferably sufficient to be able to compensate for the post-moulding shrinkage which, in the case of HDPE tanks, is about 3%.

The moulding of fuel tanks generally starts with a parison. The term "parison" is understood to mean that a preform, generally extruded, which is intended to form the wall of the tank after being moulded to the required shape and dimensions. In general, plastic fuel tanks are moulded by thermoforming flat sheets or by blow-moulding an extruded tubular parison, which does not necessarily have to be made of a single part.

Preferably, the tank is moulded by blowing a parison consisting of two separate parts, which may for example be two sheets. However, these parts preferably result from cutting one and the same extruded tubular parison as described in Application EP 1 110 697 mentioned above, the content of which for this purpose is incorporated for reference into the present application.

According to this variant, after a single parison has been extruded, it is cut over its entire length along two diametrically opposed lines, so as to obtain two separate portions (sheets).

Compared with the moulding of two separately extruded sheets, of constant thickness, the above method of implementation allows the use of parisons having a variable thickness (that is to say a thickness that is not constant over their length), which are obtained by a suitable extrusion device (generally an extruder provided with a die having a positionally-adjustable mandrel). Such a parison takes account of the thickness reduction that occurs during moulding at certain points on the parison, as a result of non-constant levels of deformation of the material in the mould.

No matter what the technique for moulding the parison, this does involve by definition the use of a mould comprising in general two impressions that are intended to be in contact with the external surface of the parison, the thermoforming or blow-moulding of the parison taking place by the parison being pressed against these impressions by applying a vacuum from behind the impressions or by using a pressurized gas injected into the parison.

According to an advantageous variant of the invention, the mould also includes a core. By this is meant a part of appropriate size and shape for it to be able to be inserted between the mould impressions and in particular to be introduced into the parison during moulding. Such a part is for example described in Patent GB 1 410 215, the content of which is for this purpose incorporated for reference into the present application. Advantageously, this core may be used for fastening several accessories to the parison at the same time, something which the alternative devices, such as for example robot arms, cannot in general accomplish.

In this variant, the core may also be used to inject the pressurized gas required for blowing the parison. Moreover, when the parison to be blown consisting of two parts, the core may also be used to keep the edges of these two parts hot, at least during certain steps of the process (in general, these steps precede the welding of the two parts in order to produce the tank). Two-part parisons are very suitable for this variant as they can be separated upon opening the mould and thus make it easier to fasten the fill tube.

Finally, the core may also be used to control the process, at least in part. For this purpose, it is possible for example to incorporate a camera into the core so as to display and check the quality of the fastening of the fill tube (and of other possible components of the tank) by image analysis. One or more sensors for measuring a quantity, such as force, travel, pressure, temperature, may also be fitted onto the core so as to better control the fastening of the fill tube to the parison.

According to the invention, the part for fastening the accessory may be fastened to the wall in any known manner. However, this fastening preferably benefits from the fact that the plastic is melted during moulding. Consequently, this part is advantageously fastened by welding (a technique well known in the conversion of plastics) or by snap-riveting (a technique already mentioned above, and more specific in fact to metallurgy, but which the Applicant nevertheless finds useful within the context of the invention, allowing drawbacks to be alleviated). The latter technique gives good results and is simple to apply—all that is required is to provide the fastening part with an orifice and to fasten it to the wall of the tank by snap-riveting through this orifice.

Finally, it should be noted that although the present invention has been developed within the context of fastening accessories internal to the tank during moulding, it may also be applied to the fastening of accessories external to the tank, for which shrinkage problems also occur.

The invention claimed is:

1. A method for fastening an accessory to a plastic fuel tank, comprising:
   fastening an accessory at at least two fastening points on a wall of the plastic fuel tank during the actual manufacture of the fuel tank by molding, wherein
   the accessory is provided, at least at one of the at least two fastening points, with a fastening part in such a way that, although the accessory is fastened to the wall of the fuel tank, the accessory is moveable relative to the at least one of the at least two fastening points on the wall of the fuel tank, and
   the molding of the fuel tank includes blow-molding by blowing a parison, the method further comprising inserting a core into the parison during the blow-molding and fastening several accessories to the parison via the core.

2. The method according to claim 1, wherein the fastening part is a fastening tab molded as one part with the accessory or attached to the accessory.

3. The method according to claim 2, wherein the fastening tab is a deformable tab having a geometry, or a constituent material, or both, aiding deformation of the deformable tab, and the deformable tab moveably fastens the accessory to the fuel tank.

4. The method according to claim 2, wherein the fastening tab is rigid but attached to a flexible portion of the accessory.

5. The method according to claim 2, wherein the fastening tab and the accessory are provided with complementary reliefs that allow the fastening tab and the accessory to slide relative to one another.

6. The method according to claim 1, wherein the fastening part is an anti-vibration/shock mounting.

7. The method according to claim 1, wherein all the fastening points where the accessory is fastened to the wall of the fuel tank are provided with the fastening part and wherein the accessory is moveable relative to all the fastening points on the wall of the fuel tank.

8. The method according to claim 1, wherein the parison is an extruded tubular parison, which is cut over an entire length along two diametrically opposed lines, so as to obtain two separate portions.

9. The method according to claim 1, wherein the fastening part is provided with an orifice and wherein the accessory is fastened to the wall of the fuel tank by snap-riveting through the orifice.

10. An accessory-fastening system comprising:
    a plastic fuel tank; and
    an accessory fastenable at at least two fastening points on a wall of the fuel tank during molding of the fuel tank, the accessory including a fastening part that is moveably fastenable to the wall of the fuel tank such that the accessory is moveable relative to the at least one of the at least two fastening points on the wall of the fuel tank,
    wherein the fuel tank is blow-molded by blowing a parison and the accessory-fastening system further comprises a core inserted into the parison when the parison is blow-molded, the accessory being fastened to the fuel tank via the core.

11. The accessory-fastening system according to claim 10, wherein the fastening part is a fastening tab molded as one part with the accessory or attached to the accessory.

12. The accessory-fastening system according to claim 11, wherein the fastening tab is a deformable tab having a geometry, or a constituent material, or both, aiding deformation of the deformable tab, and the deformable tab moveably fastens the accessory to the fuel tank.

13. The accessory-fastening system according to claim 11, wherein the fastening tab is rigid but attached to a flexible portion of the accessory.

14. The accessory-fastening system according to claim 11, wherein the fastening tab and the accessory are provided with complementary reliefs that allow the fastening tab and the accessory to slide relative to one another.

15. The accessory-fastening system according to claim 10, wherein the fastening part is an anti-vibration/shock mounting.

16. The accessory-fastening system according to claim 10, wherein all the fastening points where the accessory is fastened to the wall of the fuel tank are provided with the fastening part and wherein the accessory is moveable relative to all the fastening points on the wall of the fuel tank.

17. The accessory-fastening system according to claim 10, wherein the fastening part is provided with an orifice and wherein the accessory is fastened to the wall of the fuel tank by snap-riveting through the orifice.

* * * * *